(12) United States Patent
Thibault et al.

(10) Patent No.: US 8,787,521 B2
(45) Date of Patent: Jul. 22, 2014

(54) SYSTEM AND METHOD OF ITERATIVE IMAGE RECONSTRUCTION FOR COMPUTED TOMOGRAPHY

(75) Inventors: Jean-Baptiste Thibault, Milwaukee, WI (US); Bruno Kristiaan Bernard De Man, Clifton Park, NY (US); Kai Zeng, Rexford, NY (US); Zhou Yu, Waukesha, WI (US); Charles Addison Bouman, Jr., West Lafayette, IN (US); Ken David Sauer, South Bend, IN (US)

(73) Assignees: General Electric Company, Schenectady, NY (US); University of Notre Dame du Lac, Notre Dame, IN (US); Purdue Research Foundation, West Lafayette, IN (US)

( * ) Notice: Subject to any disclaimer, the term of this patent is extended or adjusted under 35 U.S.C. 154(b) by 1213 days.

(21) Appl. No.: 12/646,653

(22) Filed: Dec. 23, 2009

(65) Prior Publication Data

US 2011/0150308 A1    Jun. 23, 2011

(51) Int. Cl.
*G06K 9/00* (2006.01)
(52) U.S. Cl.
USPC ............................................ 378/20; 382/131
(58) Field of Classification Search
USPC ................... 382/131; 378/98.9, 4–20
See application file for complete search history.

(56) References Cited

U.S. PATENT DOCUMENTS

| | | | | |
|---|---|---|---|---|
| 5,287,276 A | * | 2/1994 | Crawford et al. | 378/4 |
| 5,297,215 A | * | 3/1994 | Yamagishi | 382/131 |
| 5,396,418 A | * | 3/1995 | Heuscher | 378/15 |
| 5,633,951 A | * | 5/1997 | Moshfeghi | 382/154 |
| 6,438,403 B1 | * | 8/2002 | Cline et al. | 600/410 |
| 6,496,560 B1 | * | 12/2002 | Lin et al. | 378/62 |
| 6,512,807 B1 | * | 1/2003 | Pohlman et al. | 378/4 |
| 6,539,074 B1 | * | 3/2003 | Yavuz et al. | 378/4 |
| 6,745,066 B1 | * | 6/2004 | Lin et al. | 600/425 |
| 6,757,423 B1 | * | 6/2004 | Amini | 382/154 |
| 6,816,607 B2 | * | 11/2004 | O'Donnell et al. | 382/131 |
| 6,888,914 B2 | * | 5/2005 | Edic | 378/4 |
| 7,042,975 B2 | * | 5/2006 | Heuscher | 378/8 |
| 7,154,498 B2 | * | 12/2006 | Cowan et al. | 345/419 |
| 7,676,018 B2 | * | 3/2010 | Grass et al. | 378/8 |
| 7,715,519 B2 | * | 5/2010 | Tsukagoshi et al. | 378/4 |

(Continued)

FOREIGN PATENT DOCUMENTS

WO    2007031899 A2    3/2007

OTHER PUBLICATIONS

Gravier et al., "Tomographic Reconstruction of Dynamic Cardiac Image Sequences," IEEE Transactions On Image Processing, vol. 16, No. 4, Apr. 2007, pp. 932-942.

(Continued)

*Primary Examiner* — Hoon Song
(74) *Attorney, Agent, or Firm* — Ziolkowski Patent Solutions Group, SC

(57) ABSTRACT

A system and method include acquisition of a set of image data corresponding to a time period of data acquisition, the set of image data corresponding to a plurality of voxels, wherein each of the plurality of voxels corresponds to a distinct acquisition time within the time period of data acquisition. The system and method further include the modeling of the plurality of voxels as a function of time based on a plurality of kinetic parameters associated therewith and reconstruction of an image from the set of image data based on the modeled plurality of voxels.

33 Claims, 5 Drawing Sheets

(56) References Cited

U.S. PATENT DOCUMENTS

| | | | |
|---|---|---|---|
| 8,411,914 B1* | 4/2013 | Mangoubi et al. | 382/128 |
| 2002/0123680 A1* | 9/2002 | Vaillant et al. | 600/407 |
| 2004/0081270 A1* | 4/2004 | Heuscher | 378/4 |
| 2004/0175024 A1* | 9/2004 | Rasche et al. | 382/128 |
| 2005/0057562 A1* | 3/2005 | Cowan et al. | 345/419 |
| 2005/0249393 A1* | 11/2005 | Kropfeld | 382/131 |
| 2006/0045318 A1* | 3/2006 | Schoisswohl et al. | 382/128 |
| 2006/0083415 A1* | 4/2006 | El Fakhri et al. | 382/128 |
| 2006/0104410 A1* | 5/2006 | Sauer et al. | 378/4 |
| 2006/0235295 A1* | 10/2006 | Boese et al. | 600/428 |
| 2007/0053482 A1* | 3/2007 | Kohler et al. | 378/8 |
| 2007/0165920 A1* | 7/2007 | Gering et al. | 382/128 |
| 2008/0031404 A1* | 2/2008 | Khamene et al. | 378/6 |
| 2008/0130824 A1* | 6/2008 | Fujisawa | 378/4 |
| 2008/0137936 A1* | 6/2008 | Boese et al. | 382/132 |
| 2008/0192997 A1* | 8/2008 | Grass et al. | 382/128 |
| 2008/0232666 A1* | 9/2008 | Rottger | 382/131 |
| 2008/0312527 A1* | 12/2008 | Masumoto et al. | 600/425 |
| 2009/0028409 A1* | 1/2009 | Tsukagoshi et al. | 382/131 |
| 2009/0238428 A1* | 9/2009 | Shinagawa et al. | 382/131 |
| 2010/0232662 A1* | 9/2010 | Spies et al. | 382/131 |

OTHER PUBLICATIONS

Kamasak et al., "Direct Reconstruction of Kinetic Parameter Images From Dynamic PET Data," IEEE Transactions On Medical Imaging, vol. 24, No. 5, May 2005, pp. 636-650.

Thibault et al., "A three-dimensional statistical approach to improved image quality for multislice helical CT," Medical Physics, vol. 34, No. 11, Nov. 2007, pp. 4526-4544.

Ziegler et al., "Noise and resolution in images reconstructed with FBP and OSC algorithms for CT," Medical Physics, vol. 34, No. 2, Feb. 2007, pp. 585-598.

Meikle et al., "Parametric image reconstruction using spectral analysis of PET projection data," Phys. Med. Biol., vol. 43, 1998, pp. 651-666.

Matthews et al., "The direct calculation of parametric images from dynamic PET data using maximum-likelihood iterative reconstruction," Phys. Med. Biol., vol. 42, 1997, pp. 1155-1173.

* cited by examiner

SYSTEM AND METHOD OF ITERATIVE IMAGE RECONSTRUCTION FOR COMPUTED TOMOGRAPHY

BACKGROUND OF THE INVENTION

Embodiments of the invention relate generally to diagnostic imaging and, more particularly, to a system and method of iterative image reconstruction for computed tomography.

Typically, in computed tomography (CT) imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction. Alternatively, x-ray detectors may use a direct conversion detector, such as a CZT detector, in lieu of a scintillator.

CT systems typically use analytical algorithms such as a filtered back-projection algorithm to reconstruct images from the acquired image data. Alternatively, an iterative technique may be used for reconstruction to improve image quality. For example, a model-based iterative reconstruction algorithm may be used to estimate an image based on pre-determined models of the CT system, the acquired projection data, and the reconstructed image such that the reconstructed image best fits the image data.

Conventional iterative algorithms typically assume that voxel values are constant over time. However, in clinical applications, this assumption may be violated due to various reasons, such as patient motion, breathing, peristalsis, heartbeats, or contrast agent flow in perfusion studies, for example. In such scenarios, iterative algorithms often generate artifacts that are more pronounced and may extend farther from the source of motion than in analytical reconstruction algorithms.

Therefore, it would be desirable to design a system and method of iterative image reconstruction that overcome the aforementioned drawbacks.

BRIEF DESCRIPTION OF THE INVENTION

In accordance with one aspect of the invention, a computer readable storage medium has stored thereon a computer program comprising instructions, which, when executed by a computer, cause the computer to acquire a set of image data corresponding to a time period of data acquisition, the set of image data corresponding to a plurality of voxels, wherein each of the plurality of voxels corresponds to a distinct acquisition time within the time period of data acquisition. The instructions further cause the computer to model the plurality of voxels as a function of time based on a plurality of kinetic parameters associated therewith and reconstruct an image from the set of image data based on the modeled plurality of voxels.

In accordance with another aspect of the invention, a method includes acquiring a set of CT image data corresponding to a plurality of image voxels, wherein each of the plurality of image voxels corresponds to a distinct time of data acquisition, estimating a plurality of sets of kinetic parameters for the plurality of image voxels, each set of kinetic parameters representing a motion of an object at the distinct time of data acquisition of the associated image voxel, and reconstructing an image of the object based on the estimated plurality of sets of kinetic parameters.

In accordance with another aspect of the invention, an imaging system includes a rotatable gantry having an opening for receiving an object to be scanned, an x-ray source coupled to the rotatable gantry and configured to project x-rays through the opening, and a generator configured to energize the x-ray source to an energy level to generate x-rays corresponding to the energy level. The imaging system also includes a detector having pixels therein, the detector attached to the rotatable gantry and positioned to receive x-rays projected from the x-ray source and a computer. The computer is programmed to access a CT projection dataset corresponding to a plurality of image voxels acquired over a period of data acquisition, model a plurality of kinetic parameters corresponding to the plurality of image voxels, the plurality of kinetic parameters representing a motion of the object, and reconstruct the CT projection dataset based on the plurality of kinetic parameters.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The operating environment of embodiments of the invention is described with respect to a sixty-four-slice computed tomography (CT) system. However, it will be appreciated by those skilled in the art that embodiments of the invention are equally applicable for use with other multi-slice configurations. Moreover, embodiments of the invention will be described with respect to the detection and conversion of x-rays. However, one skilled in the art will further appreciate that embodiments of the invention are equally applicable for the detection and conversion of other high frequency electromagnetic energy. Embodiments of the invention will be described with respect to a "third generation" CT scanner, but are equally applicable with other CT systems.

Figure 1:
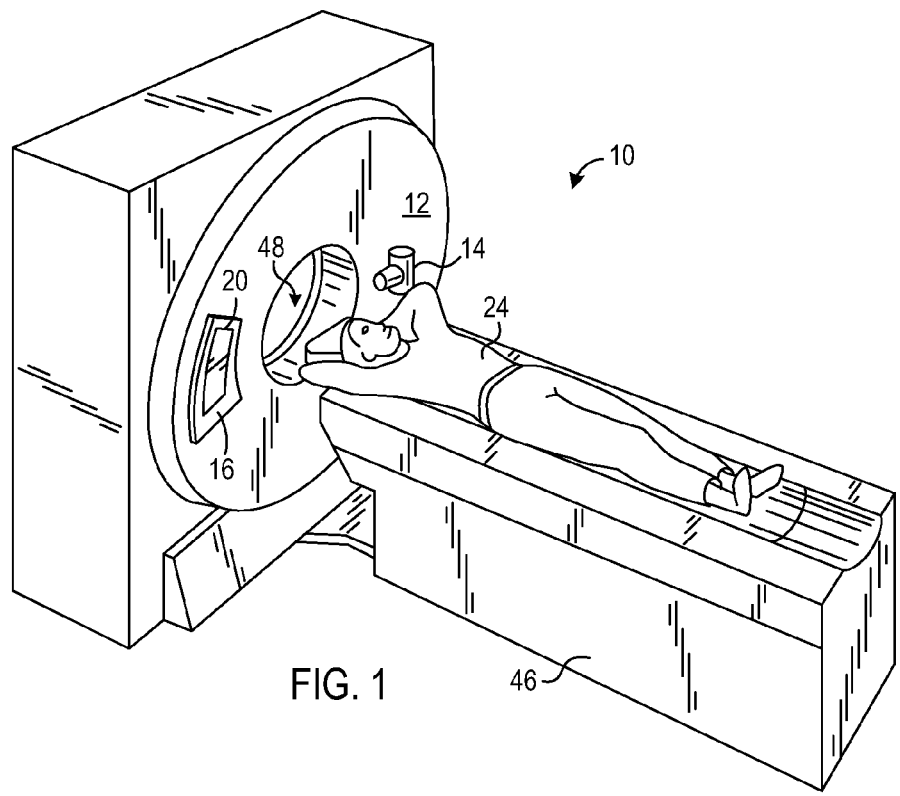
FIG. 1 is a pictorial view of a CT imaging system.
Figure 2:
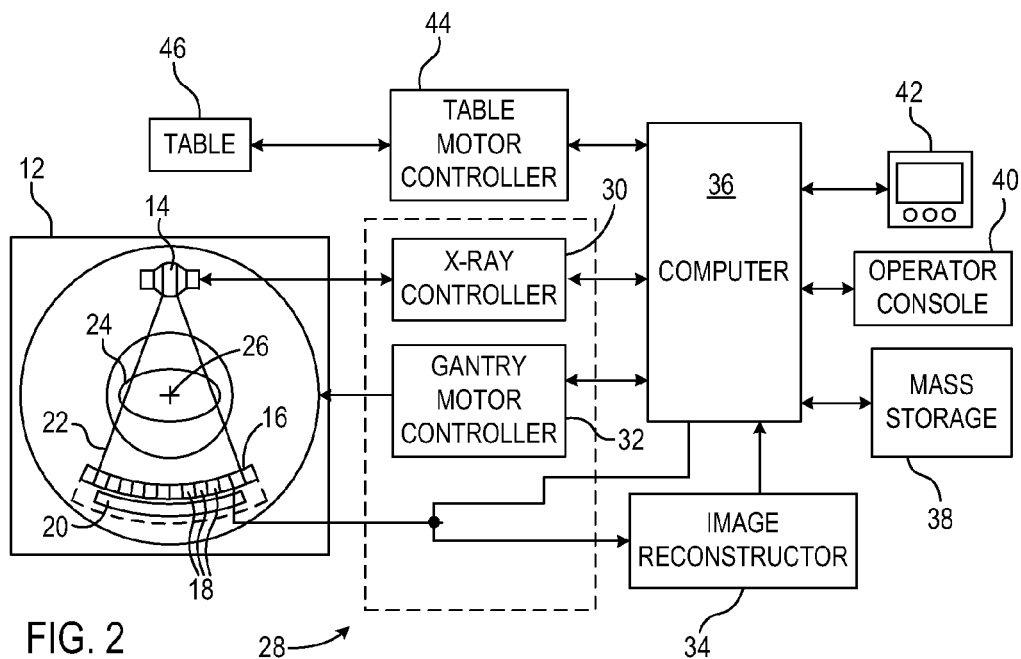
FIG. 2 is a block schematic diagram of the system illustrated in FIG. 1.

Referring to FIG. 1, a computed tomography (CT) imaging system 10 is shown as including a gantry 12 representative of a "third generation" CT scanner. Gantry 12 has an x-ray source 14 that projects a beam of x-rays toward a detector assembly or collimator 18 on the opposite side of the gantry 12. Referring now to FIG. 2, detector assembly 18 is formed by a plurality of detectors 20 and data acquisition systems (DAS) 32. The plurality of detectors 20 sense the projected x-rays 16 that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
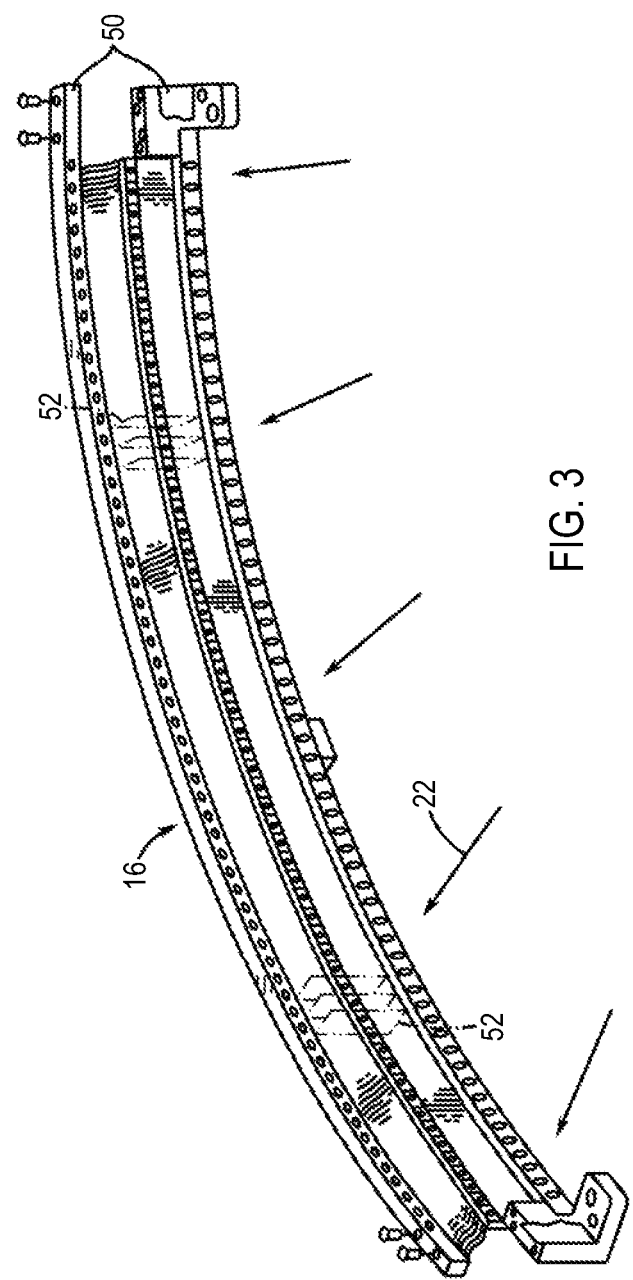
FIG. 3 is a perspective view of one embodiment of a CT system detector array.

As shown in FIG. 3, detector assembly 18 includes rails 17 having collimating blades or plates 19 placed therebetween. Plates 19 are positioned to collimate x-rays 16 before such beams impinge upon, for instance, detector 20 of FIG. 4 positioned on detector assembly 18. In one embodiment, detector assembly 18 includes 57 detectors 20, each detector 20 having an array size of 64×16 of pixel elements 50. As a result, detector assembly 18 has 64 rows and 912 columns (16×57 detectors) which allows 64 simultaneous slices of data to be collected with each rotation of gantry 12.

Figure 4:
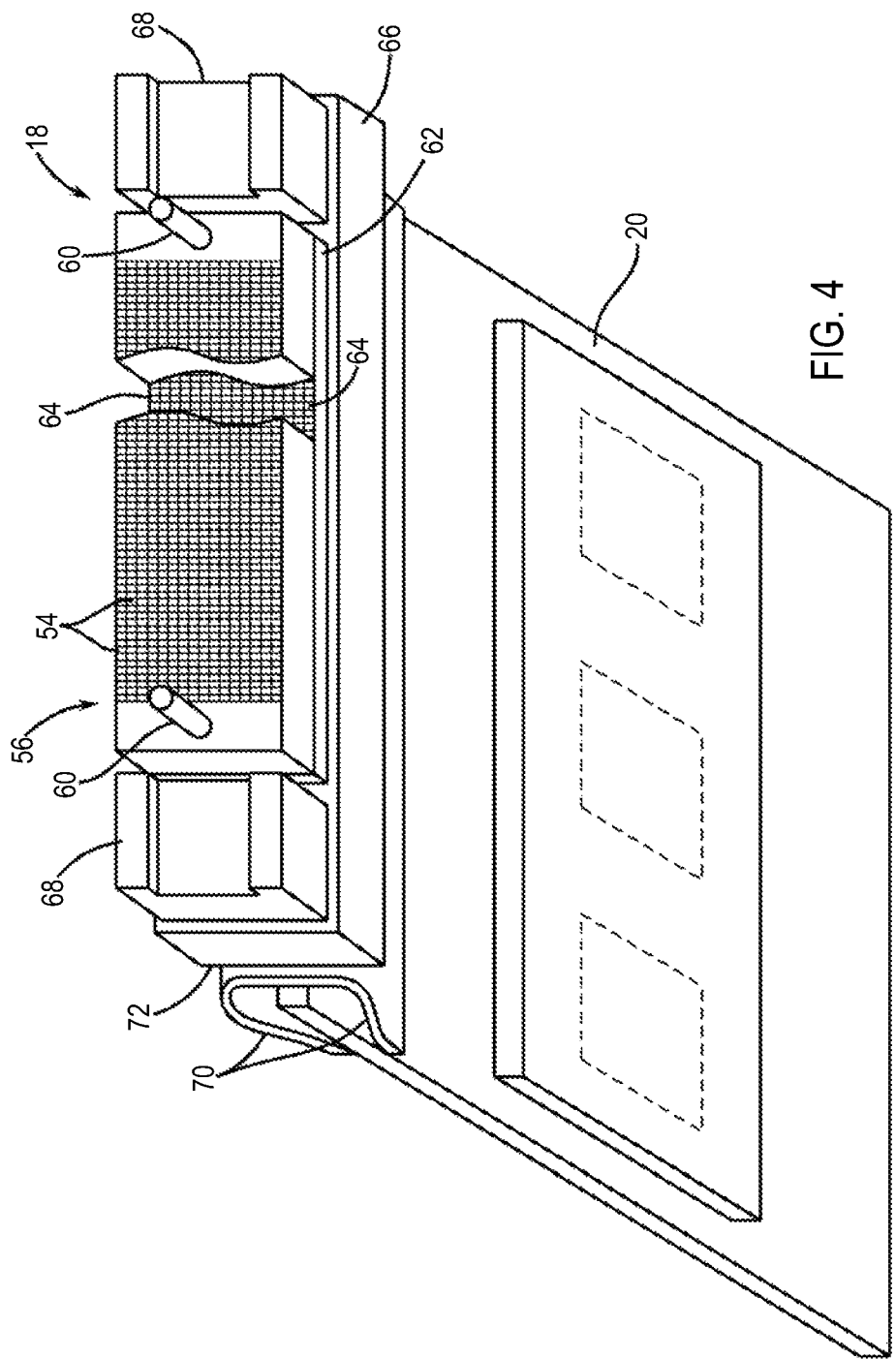
FIG. 4 is a perspective view of one embodiment of a detector.

Referring to FIG. 4, detector 20 includes DAS 32, with each detector 20 including a number of detector elements 50 arranged in pack 51. Detectors 20 include pins 52 positioned within pack 51 relative to detector elements 50. Pack 51 is positioned on a backlit diode array 53 having a plurality of diodes 59. Backlit diode array 53 is in turn positioned on multi-layer substrate 54. Spacers 55 are positioned on multi-layer substrate 54. Detector elements 50 are optically coupled to backlit diode array 53, and backlit diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52.

In the operation of one embodiment, x-rays impinging within detector elements 50 generate photons which traverse pack 51, thereby generating an analog signal which is detected on a diode within backlit diode array 53. The analog signal generated is carried through multi-layer substrate 54, through flex circuits 56, to DAS 32 wherein the analog signal is converted to a digital signal.

Figure 5:
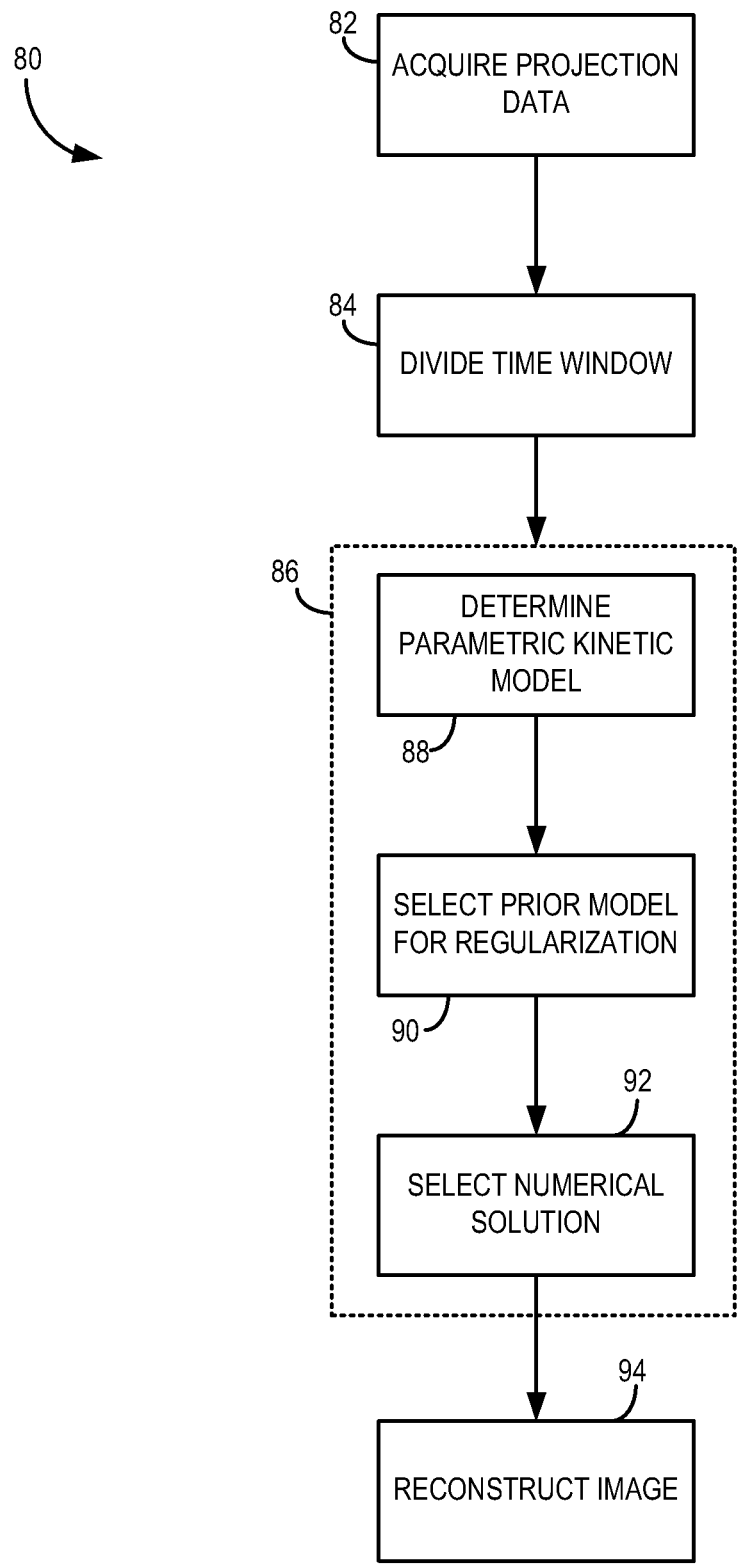
FIG. 5 is a flowchart illustrating a technique for reconstructing an image according to embodiments of the invention.

Referring now to FIG. 5, a kinetic parameter reconstruction technique 80 is set forth according to an embodiment of the invention. Technique 80 models voxel values as a function of time when the voxels are reconstructed from acquired CT projection data. Technique 80 begins by acquiring projection data at step 82 over a given time window or period of data acquisition. During data acquisition, each voxel $x_j$ in the image volume is illuminated by or exposed to an x-ray source, such as x-ray source 14 of FIG. 1, over a time window $T_j$. According to embodiments of the invention, $T_j$ may be different across voxels depending on the location of a voxel relative to the source trajectory. At step 84, time window $T_j$ is divided into a number of intervals or bins, K, each having a width, dt, in seconds. According to one embodiment, each bin may have a width of 10 ms, for example.

Technique 80 implements a numerical iterative algorithm at step 86. In order to reduce the dimensionality of the iteration, kinetic models are introduced to parameterize voxel change over time using a set of kinetic parameters specific to the time variance of each individual voxel. In general, the kinetic model may be represented as a function that maps a matrix of kinetic parameters, $\phi$, to the image at time, t, as follows:

$$x^{(k)} = \kappa(\phi, t_k) \quad \text{(Eqn. 1),}$$

where $x_k$ is a vector of voxel values and $t_k$ is the sampling time of the $k^{th}$ time interval.

In the iterative framework, images may be estimated by minimizing a cost function:

$$\hat{x} = \underset{x \in \Omega}{\operatorname{argmin}} \{(y - F(x))^T D(y - F(x)) + U(x)\}, \quad \text{(Eqn. 2)}$$

where x is the vector of voxels in the image, y is the vector of acquired projection data, and $\Omega$ is a convex set of feasible solutions, for example, a set of non-negative images. A forward operator, F(x), generates a set of synthesized projections from an existing estimate x in a manner similar to that of the CT scanner. According to one embodiment, the forward operator is a linear model F(x)=Ax, where the system matrix, A, describes the forward projection operator of the CT scanner. A statistical noise model denoted by the matrix D represents the noise characteristics of the measurements, which may be used to form a distortion measure to compare the synthesized projection data against the acquired data. While the cost function is represented in Eqn. 2 in quadratic form, other cost functions may be used, according to alternative embodiments. A regularization function, U(x), which may be derived from a prior distribution of the image, enforces constraints on the reconstruction, such as smoothness in relatively homogenous regions while preserving edges, for example.

Given the general kinetic model of Eqn. 1 and the general cost function of Eqn. 2, technique 80 aims to determine an estimate, $\hat{\phi}$, that minimizes the following cost function of the matrix of kinetic parameters, $\phi$:

$$\hat{\varphi} = \underset{\varphi}{\operatorname{argmin}} \quad \text{(Eqn. 3)}$$

$$\left\{ \sum_{k=1}^{K} \left( (y^{(k)} - A^{(k)} \kappa(\varphi, t_k))^T D^{(k)} (y^{(k)} - A^{(k)} \kappa(\varphi, t_k))^T \right) + U(\varphi) \right\}.$$

The first term of Eqn. 3, $((y^{(k)} - A^{(k)} \kappa(\phi, t_k))^T D^{(k)} (y^{(k)} - A^{(k)} \kappa(\phi, t_k))^T)$, represents a summation of a series of data mismatch penalty functions for each sampling time, $t_k$, where $y^{(k)}$ is a vector of measurements for the $k^{th}$ time interval, $A^{(k)}$ represents a forward model relative to $y^{(k)}$ and $x^{(k)}$, and $D^{(k)}$ is a diagonal matrix that assigns confidence weights to each measurement in $y^{(k)}$ according to a statistical model. The second term of Eqn. 3, $U(\phi)$, is a regularization function for the kinetic parameters that penalizes noise in the reconstruction.

Given this framework, technique 80 implements the kinetic parameter reconstruction algorithm of step 86 is determined first by developing a parametric kinetic model at step 88. The kinetic model, $\kappa(\phi, t_k)$, is developed to describe the kinetics of each of the voxels (i.e., the amount by which each voxel varies over time). The value of an individual voxel, s, as a function of time may be expressed as:

$$x_s(t) = \kappa_s(\phi_s, t) \quad \text{(Eqn. 4)},$$

where the function $\kappa$ represents the kinetic model and $\phi_s$ is the vector of kinetic parameters for voxel s.

The kinetic model is represented as a combination of functions that represent individual components of the signal to be reconstructed. In one embodiment, $x_s(t)$ may be formed of a combination of individual non-linear functions, such as:

$$x_s(t) = A e^{\phi t} \quad \text{(Eqn. 5)},$$

which is non-linear in the parameter $\phi$. For example, the following family of exponential functions may be used:

$$x_s(t) = 1 - \alpha \exp\left[-\beta\left(\frac{t - T_0}{T_w}\right)\right], \quad \text{(Eqn. 6)}$$

where $T_o$ is a reference time, $T_w$ is the length of the time window, and $\alpha$ and $\beta$ are the parameters to be estimated.

According to another embodiment, $x_s(t)$ may be a linear combination of a set of basis functions, which are elements of a basis for a function space. The combination of basis functions may be selected to represent any signal that may exist in that function space. Using a combination of basis functions instead of a non-linear model simplifies the estimation problem by linearizing the equations, which allows simpler numerical algorithms to be used to find a solution.

For the kinetic model, basis functions represent the elements of the decomposition of a potentially complex function for the voxel changes over time as a number of simple elements. Mathematically, this corresponds to rewriting Eqn. 4 as:

$$x_s(t) = \sum_{i=1}^{m} \varphi_{s,i} b_i(t), \quad \text{(Eqn. 7)}$$

where $b_i(t)$ is the $i^{th}$ basis function. Voxel values may be sampled at time points $t_k$, k=1, 2, ... K, and the sampled values may be given by $x_{s,k} = x_s(t_k)$. The K by 1 vector of the values of voxel s sampled at different $t_k$ is represented by $\vec{x}_s$ and calculated according to:

$$\vec{x}_s = M_s \phi_s \quad \text{(Eqn. 8)},$$

where $M_s$, is a matrix having rows $[M_s]_{i,k} = b_i(t_k)$ that are formed from the basis functions.

Numerous choices of basis functions are available to model the kinetics of the voxels. For example, the set of polynomial basis functions or Lagrange basis functions:

$$b_i(t) = (t - T_s)^i \quad \text{(Eqn. 9)}$$

may be used, where $T_s$ is a reference time, for instance the desired time to freeze the motion. For example, basis functions may be defined as:

$$b_1(t) = 1 \quad \text{(Eqn. 10)}$$

$$b_2(t) = t - T_s \quad \text{(Eqn. 11)}$$

$$b_3(t) = (t - T_s)^2 \quad \text{(Eqn. 12)}.$$

According to one embodiment for helical CT scanning, reference time, $T_s$, corresponds to the time where the x-ray source crosses the z position of voxel s. Alternatively, reference time $T_s$ is defined as the center of the time window during which voxel s is illuminated by the x-ray source, according to another embodiment. In yet another alternative embodiment, $T_s$ is selected individually for all the voxels in the volume and corresponds to the time when the projections are measured parallel to the local edge structure in order to better resolve moving edges in the reconstruction results. That is, the basis function for each voxel s may be centered at $T_s$, where $T_s$ is determined as a function of local edge direction and scan geometry.

The basis functions may also include spline basis functions or cosine basis functions, which are based on upon the theory of Fourier series expansion. For example, the cosine basis functions may be:

$$b_p(t) = \cos\left[p\pi\left(\frac{t - T_s}{T_w} - \frac{1}{2}\right)\right], \quad \text{(Eqn. 13)}$$

where p=0, 1, 2, ... is an integer, and $T_w$ is the time window a voxel is illuminated by or exposed to the x-ray beam.

Alternative methods may also be used to develop the kinetic model. In one embodiment, spatially-varying basis functions may be developed to best fit the kinetics of a localized region of space. For example, in one part of the object, a particular set of basis functions is used, whereas in another part of the object a different set of basis functions is used. Alternatively, every voxel in the image volume may use its own set of basis functions. This embodiment may be implemented, for example, to reconstruct the kinetic parameters of only the voxels in regions of the volume where changes occur over time (e.g., in locations where motion occurs). That is, in regions where there is no motion, densities in $x_s$, may be directly estimated per Eqn. 1, whereas in regions where there is motion, the parameters of the kinetic model $\phi_s$ are estimated per Eqn. 3.

In another embodiment, the kinetic information may be extracted directly from the acquired data instead of using a pre-determined set of basis functions. Alternatively, kinetic models may be designed based on a specific scan protocol. For example, periodic models may result in a better fit to cardiac motion or breathing motion, whereas exponential models might be suitable for perfusion studies where slower changes in contrast densities are typical. In yet another embodiment, external information (i.e., information not available in either the acquired data or the reconstructed images) may be used in the design of kinetic models. For instance, gating information, ECG signals, and/or motion maps obtained from ultrasound imaging may be used for improved kinetic models.

Referring again to technique 80, once the parametric kinetic model is developed at step 88, the kinetic parameters may be regularized in order to stabilize the solution and reduce noise in the reconstruction. At step 90, technique 80 selects a prior model that involves a corresponding regularization function U(φ) in order to stabilize the estimation of the kinetic parameters. Assuming that the parameter $\phi_{s,I}$ is the final image displayed to a user, a similar image prior model as used in conventional MBIR may be used for $\phi_{s,I}$, according to one embodiment of the invention. Thus, the regularization function U(φ) over $\phi_{s,I}$ may be written in a general form as:

$$U_1(\varphi_1) = \sum_{\{s,q\} \in N} b_{sq} \rho(\varphi_{s,1} - \varphi_{q,1}),  \quad \text{(Eqn. 14)}$$

where N is the set of all neighboring voxel pairs {s,q}, and ρ is the potential function that penalizes large variations in the image. A similar regularization may be applied to each $\phi_{s,i}$.

According to another embodiment, the kinetic parameters may be regularized based on temporal changes or variations in the voxel values. A simple prior model may assume the kinetic parameters are independent of each other. For example, $L_2$ norm regularization may be used as follows:

$$U_i(\varphi_i) = \frac{1}{\sigma_i^2} \sum_s \varphi_{s,i}^2  \quad \text{(Eqn. 15)}$$

where $U_i$ is the regularization function for the $i^{th}$ component of the kinetic parameters and $\sigma_i^2$ adjusts the regularization strength. In a similar manner, the $L_1$ norm regularization may be used to regularize the kinetic parameters, according to another embodiment as follows:

$$U_i(\varphi_i) = \frac{1}{\sigma_i^2} \sum_s |\varphi_{s,i}|. \quad \text{(Eqn. 16)}$$

The $L_1$ norm regularization produces a sparse solution in the kinetic parameters (i.e., a solution that tends to localize the estimation of non-zero kinetic parameters in small regions where motion actually exists, while setting parameters of other regions without motion to zero). While $L_1$ and $L_2$ norm regularization have been described herein, one skilled in the art will recognize that other types of norm regularization may be implemented as well.

Image quality of the kinetic parameter reconstruction may be improved by building more accurate prior models. First, the spatial dependency of the kinetic parameters may be assumed. In one embodiment, penalty functions may be developed to penalize the spatial variation in the reconstructions as follows:

$$U_i(\varphi) = \frac{1}{\sigma_i^2} \sum_{\{s,q\} \in N} b_{sq} \rho_i(\varphi_{s,i} - \varphi_{q,i}), \quad \text{(Eqn. 17)}$$

where $\rho_i$ is the potential function for the $i^{th}$ parameter.

Second, the dependency of the kinetic parameters may be modeled within each voxel. For example, the vector of kinetic parameters may be modeled as zero mean Gaussian random vectors. In this case, the penalty function has the following form:

$$U(\varphi) = \sum_s (\varphi_s^T \Sigma^{-1} \varphi_s), \quad \text{(Eqn. 18)}$$

where Σ is the covariance matrix of the random vector, which may be estimated from the image data.

Third, regularization may be performed in the image domain instead of in the parameter domain. For example, the vector of voxel values, $x^{(k)}$, may be calculated from the matrix of kinetic parameters, φ, and the variance in the image domain may then be penalized, which results in the following regularization function:

$$U(\varphi) = \sum_{k=1}^{K} \frac{1}{\sigma_k^2} \sum_{\{s,q\} \in N} b_{sq} \rho(\kappa_s(\varphi_s, t_k) - \kappa_q(\varphi_q, t_k)). \quad \text{(Eqn. 19)}$$

After the kinetic parameters are regularized at step 90, technique 80 selects a numerical algorithm that efficiently finds the solution of the optimization problem set forth in Eqn. 3 at step 92. According to one embodiment, a parametric iterative coordinate decent algorithm (P-ICD) may be selected. The P-ICD algorithm updates one voxel at a time, where all the kinetic parameters of the voxel are updated simultaneously. In other words, when voxel s is updated, the kinetic parameters of all other voxels are fixed in the cost function, which is then minimized over $\phi_s$ at each step. After voxel s has been updated, including the corresponding kinetic parameters, the process is repeated for another voxel until desired convergence has been reached.

According to alternative embodiments, other numerical algorithms may be selected to solve the optimization problem set forth in Eqn. 3 at step 92. For example, solutions may be derived based on gradient-ascent/-descent approaches, conjugate gradient approaches, ordered subsets approaches, grouped coordinate descent approaches, and block-based approaches.

Changes in the voxel intensity values are due to object motion. Therefore, according to one embodiment of the invention, the motion of voxels (e.g., displacement or velocity) may be directly modeled, instead of modeling the time dependence of the voxel values. The computation of change in intensity as a function of time from the motion model is based on knowledge of spatial intensity changes in the object from a first-pass reconstruction. An explicit voxel model is defined as:

$$\mu_j(t) = \mu_j(t_0) + (t - t_0)\left(vx_j \frac{\partial \mu}{\partial x_j} + vy_j \frac{\partial \mu}{\partial y_j} + vz_j \frac{\partial \mu}{\partial z_j}\right), \quad \text{(Eqn. 20)}$$

where μ represents voxel values, $vx_j$, $vy_j$, and $vz_j$ are the variables to be reconstructed, and $$\frac{\partial \mu}{\partial x_j}, \frac{\partial \mu}{\partial y_j}, \text{ and } \frac{\partial \mu}{\partial z_j}$$

are spatial derivatives that may be pre-computed based on a first-pass reconstruction, such as, for example, an iterative or filtered back projection reconstruction.

To minimize the number of unknowns, a gradient map may be computed based on the first-pass (e.g., iterative or filtered back projection) reconstruction and motion may be modeled only in the direction of the gradient as follows:

$$\mu_j(t)=\mu_j(t_0)+(t-t_0)*v_j^{grad}*\|\text{Grad}_j\| \quad \text{(Eqn. 21)},$$

where $v^{grad}$ is the velocity of voxel u in the direction of the gradient. According to one embodiment, velocity of voxel u may be determined based on a linear approximation of voxel motion in the direction of the gradient. Alternatively, velocity of voxel u may be modeled using a higher order approximation of the motion of the voxels, such as a higher order polynomial function to more accurately approximate the behavior of a voxel.

According to another embodiment, a coarser representation for the motion vectors may be used, such as a coarser voxel grid for $v_j^{grad}$ than for $u_j(t_0)$, for example. That is, if the image has a resolution of 512×512, for example, the velocity values for the voxels may be represented using a 256×256 grid, where each velocity value represents a 2×2 neighborhood of image voxels, thereby reducing computation time.

Alternatively, a sparse set of motion vectors may be used only in areas of strong gradients, and motion may be assumed to be zero elsewhere. The gradient map, $\text{Grad}_j$, may be estimated based on a first-pass filtered back projection reconstruction or based on an initial iterative reconstruction. Also, the gradient map may be regularized to ensure that the motion vectors change smoothly. Similarly, during the actual reconstruction, the motion estimation may be spatially regularized to ensure that motion is spatially consistent. Further, the motion estimation may be magnitude normalized (e.g., using an $L_1$ or $L_2$ norm) to ensure that the motion is estimated conservatively or sparsely.

Once the direction of motion is known, the change in intensity as a function of motion displacement may be derived from the initial reconstruction, resulting in the following general model:

$$\mu_j(t)=\mu_j(t_0)+\mu(x_0+(t-t_0)*v_j^{grad}*\text{Grad}_j) \quad \text{(Eqn. 22)}.$$

Using the kinetic parameter iterative reconstruction algorithm developed at step 86, technique 80 reconstructs an image at step 94. Because the kinetic parameter algorithm accounts for voxel motion, motion artifacts are reduced in the reconstructed image. In one embodiment, technique 80 may reconstruct a snapshot image of an object frozen at a desired time point or sample time. For example, a snapshot image of the chest may be reconstructed with reduced motion artifacts caused by breathing and heart motion. In another embodiment, technique 80 may be applied to reconstruct a sequence of images over a period of time to produce a four-dimensional reconstruction, such as, for example, contrast agent flow over time in a perfusion study. Because the kinetic parameter algorithm determines voxel motion, an external means for tracking motion, such as ECG gating or external motion tracking equipment, may be omitted from use with the reconstruction.

Figure 6:
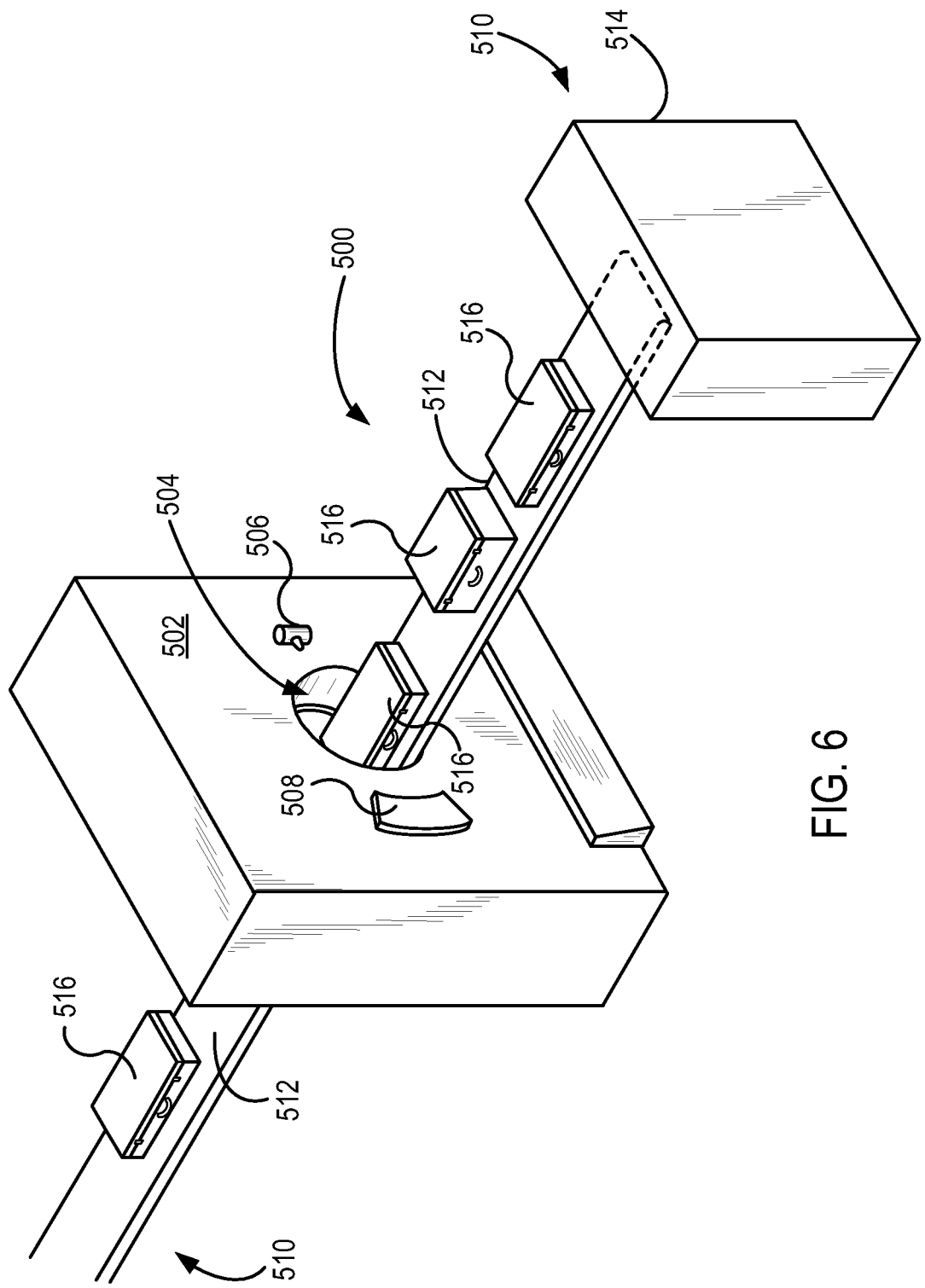
FIG. 6 is a pictorial view of a CT system for use with a non-invasive package inspection system.

Referring now to FIG. 6, package/baggage inspection system 500 includes a rotatable gantry 502 having an opening 504 therein through which packages or pieces of baggage may pass. The rotatable gantry 502 houses a high frequency electromagnetic energy source 506 as well as a detector assembly 508 having scintillator arrays comprised of scintillator cells similar to that shown in FIGS. 3 and 4. A conveyor system 510 is also provided and includes a conveyor belt 512 supported by structure 514 to automatically and continuously pass packages or baggage pieces 516 through opening 504 to be scanned. Objects 516 are fed through opening 504 by conveyor belt 512, imaging data is then acquired, and the conveyor belt 512 removes the packages 516 from opening 504 in a controlled and continuous manner. As a result, postal inspectors, baggage handlers, and other security personnel may non-invasively inspect the contents of packages 516 for explosives, knives, guns, contraband, etc.

A technical contribution for the disclosed method and apparatus is that is provides for a computer implemented system and method of iterative image reconstruction for computed tomography.

Therefore, in accordance with one embodiment, a computer readable storage medium has stored thereon a computer program comprising instructions, which, when executed by a computer, cause the computer to acquire a set of image data corresponding to a time period of data acquisition, the set of image data corresponding to a plurality of voxels, wherein each of the plurality of voxels corresponds to a distinct acquisition time within the time period of data acquisition. The instructions further cause the computer to model the plurality of voxels as a function of time based on a plurality of kinetic parameters associated therewith and reconstruct an image from the set of image data based on the modeled plurality of voxels.

In accordance with another embodiment, a method includes acquiring a set of CT image data corresponding to a plurality of image voxels, wherein each of the plurality of image voxels corresponds to a distinct time of data acquisition, estimating a plurality of sets of kinetic parameters for the plurality of image voxels, each set of kinetic parameters representing a motion of an object at the distinct time of data acquisition of the associated image voxel, and reconstructing an image of the object based on the estimated plurality of sets of kinetic parameters.

In accordance with yet another embodiment, an imaging system includes a rotatable gantry having an opening for receiving an object to be scanned, an x-ray source coupled to the rotatable gantry and configured to project x-rays through the opening, and a generator configured to energize the x-ray source to an energy level to generate x-rays corresponding to the energy level. The imaging system also includes a detector having pixels therein, the detector attached to the rotatable gantry and positioned to receive x-rays projected from the x-ray source and a computer. The computer is programmed to access a CT projection dataset corresponding to a plurality of image voxels acquired over a period of data acquisition, model a plurality of kinetic parameters corresponding to the plurality of image voxels, the plurality of kinetic parameters representing a motion of the object, and reconstruct the CT projection dataset based on the plurality of kinetic parameters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-transitory computer readable storage medium having stored thereon a computer program comprising instructions, which, when executed by a computer, cause the computer to:
    acquire a set of projection data corresponding to a set of image data over a time period of data acquisition, the set of image data corresponding to a plurality of voxels, wherein each of the plurality of voxels corresponds to a distinct acquisition time within the time period of data acquisition;
    develop a mathematical model representing the plurality of voxels as a function of time based on a plurality of kinetic parameters associated therewith, the plurality of kinetic parameters corresponding to a kinetic motion of the plurality of voxels;
    calculate the plurality of kinetic parameters of the plurality of voxels from the mathematical model; and
    reconstruct an image from the set of projection data based on the calculated kinetic parameters of the plurality of voxels.

2. The computer readable storage medium of claim 1 wherein the instructions cause the computer to define a parametric function to model the plurality of voxels as a function of time.

3. The computer readable storage medium of claim 2 wherein the instructions cause the computer to:
    define a first parametric function to model a first voxel of the plurality of voxels; and
    define a second parametric function to model a second voxel of the plurality of voxels.

4. The computer readable storage medium of claim 2 wherein the instructions cause the computer to define a first linear combination of basis functions having a plurality of estimated coefficients associated therewith corresponding to the plurality of kinetic parameters.

5. The computer readable storage medium of claim 4 wherein the instructions further cause the computer to:
    define a second linear combination of basis functions different from the first linear combination of basis functions;
    model a first portion of the plurality of voxels based on the first linear combination of basis functions; and
    model a second portion of the plurality of voxels based on the second linear combination of basis functions.

6. The computer readable storage medium of claim 4 wherein the instructions cause the computer to:
    define the first linear combination of basis functions as a combination of basis functions that remain fixed throughout the reconstruction; and
    define the first linear combination of basis functions as one of a combination of polynomial functions, a combination of cosine functions, and a combination of spline functions.

7. The computer readable storage medium of claim 4 wherein the instructions cause the computer to estimate the first linear combination of basis functions during reconstruction using one of acquired data and external information.

8. The computer readable storage medium of claim 2 wherein the instructions cause the computer to define a parametric function having non-linear parameters.

9. The computer readable storage medium of claim 2 wherein the instructions cause the computer to regularize the parametric function to penalize variations in the model.

10. The computer readable storage medium of claim 9 wherein the instructions cause the computer to regularize the plurality of kinetic parameters associated with a first of the plurality of voxels independent of the plurality of kinetic parameters associated with a second of the plurality of voxels.

11. The computer readable storage medium of claim 9 wherein the instructions cause the computer to penalize a spatial variation during reconstruction.

12. The computer readable storage medium of claim 9 wherein the instructions cause the computer to independently regularize each of the plurality of kinetic parameters associated with a voxel.

13. The computer readable storage medium of claim 9 wherein the instructions cause the computer to regularize one of the plurality of kinetic parameters associated with one of the plurality of voxels based on another of the plurality of kinetic parameters associated with the one of the plurality of voxels.

14. The computer readable storage medium of claim 9 wherein the instructions cause the computer to regularize the plurality of kinetic parameters based on a temporal variation in the image.

15. The computer readable storage medium of claim 2 wherein the instructions cause the computer to estimate the plurality of kinetic parameters from the set of acquired data.

16. The computer readable storage medium of claim 15 wherein the instructions further cause the computer to sequentially update the plurality of kinetic parameters using an iterative coordinate descent algorithm.

17. The computer readable storage medium of claim 16 wherein the instructions further cause the computer to define a basis function for each of the plurality of voxels centered at a given time, wherein the given time is determined as a function of a local edge direction and a scan geometry.

18. The computer readable storage medium of claim 2 wherein the instructions cause the computer to:
    identify a number of the plurality of voxels having motion associated therewith; and
    estimate a plurality of kinetic parameters corresponding to the number of the plurality of voxels.

19. The computer readable storage medium of claim 2 wherein the instructions cause the computer to detect temporal changes in the reconstructed image based on the plurality of kinetic parameters.

20. A method comprising:
    acquiring a set of projection data corresponding to a plurality of image voxels of a set of CT image data, wherein each of the plurality of image voxels corresponds to a distinct time of data acquisition;
    selecting a kinetic parameter model to estimate a plurality of sets of kinetic parameters for the plurality of image voxels, each set of kinetic parameters representing a motion of an object at the distinct time of data acquisition of the associated image voxel;
    calculating motion of the plurality of image voxels using the kinetic parameter model; and
    reconstructing an image of the object based on the calculated motion; and
    wherein the kinetic parameter model estimates the plurality of sets of kinetic parameters for the plurality of image voxels independently from the set of projection data.

21. The method of claim 20 further comprising:
    directly reconstructing motion of the object; and
    translating the reconstructed motion into voxel intensity changes as a function of time using spatial information acquired in a first-pass reconstruction.

22. The method of claim 21 comprising modeling motion in an x-direction, a y-direction, and a z-direction using x-derivatives, y-derivatives, and z-derivatives of the first-pass reconstruction.

23. The method of claim 21 comprising modeling motion in a direction of a local gradient of the first-pass reconstruction based on one of a size of the local gradient and a change in voxel values in the first-pass reconstruction along the direction of the local gradient.

24. The method of claim 21 comprising modeling motion at a resolution different from a resolution of the image.

25. The method of claim 21 comprising modeling the plurality of voxels based on at least one of a smoothness criteria and a sparseness criteria.

26. An imaging system comprising:
   a rotatable gantry having an opening for receiving an object to be scanned;
   an x-ray source coupled to the rotatable gantry and configured to project x-rays through the opening;
   a generator configured to energize the x-ray source to an energy level to generate x-rays corresponding to the energy level;
   a detector having pixels therein, the detector attached to the rotatable gantry and positioned to receive x-rays projected from the x-ray source; and
   a computer programmed to:
      access a CT projection dataset corresponding to a plurality of image voxels acquired over a period of data acquisition;
      model a plurality of kinetic parameters corresponding to the plurality of image voxels, the model representing motion of the plurality of image voxels;
      calculate a motion of the object from the model; and
      iteratively reconstruct an image from the CT projection dataset based on the calculated motion.

27. The system of claim 26 wherein the computer is programmed to model the plurality of voxels based on a plurality of voxel values estimated directly from the set of acquired data.

28. The system of claim 27 wherein the computer is programmed to:
   divide the CT projection dataset into a plurality of data subsets corresponding to intervals of the period of data acquisition; and
   estimate the plurality of kinetic parameters corresponding to the plurality of data subsets.

29. The system of claim 26 wherein the computer is programmed to model the plurality of kinetic parameters based on parameters of the imaging system.

30. The system of claim 26 wherein the computer is further programmed to generate a snapshot image of the object frozen at a sample time.

31. The system of claim 26 wherein the computer is further programmed to generate a four-dimensional reconstruction of the object.

32. The computer readable storage medium of claim 1 wherein the instructions cause the computer to:
   iteratively calculate the plurality of kinetic parameters; and
   iteratively reconstruct the image.

33. The computer readable storage medium of claim 1 wherein the instructions cause the computer to calculate the plurality of kinetic parameters while reconstructing the image.

* * * * *